US012778083B2

(12) United States Patent
Qiu

(10) Patent No.: US 12,778,083 B2
(45) Date of Patent: Nov. 3, 2026

(54) PET LEASH DEVICE

(71) Applicant: JIANGSU ZHONGHENG PET ARTICLES JOINT-STOCK CO., LTD., Jiangsu (CN)

(72) Inventor: Bin Qiu, Jiangsu (CN)

(73) Assignee: JIANGSU ZHONGHENG PET ARTICLES JOINT-STOCK CO., LTD., Jiangsu (CN)

( * ) Notice: Subject to any disclaimer, the term of this patent is extended or adjusted under 35 U.S.C. 154(b) by 122 days.

(21) Appl. No.: 18/796,240

(22) Filed: Aug. 6, 2024

(65) Prior Publication Data

US 2025/0228213 A1 Jul. 17, 2025

(30) Foreign Application Priority Data

Jan. 12, 2024 (CN) ........................ 202410048834.3

(51) Int. Cl.
*A01K 27/00* (2006.01)

(52) U.S. Cl.
CPC ................................. *A01K 27/004* (2013.01)

(58) Field of Classification Search
CPC .................................................... A01K 27/004
See application file for complete search history.

(56) References Cited

U.S. PATENT DOCUMENTS 3,635,419 A * 1/1972 Pringle .................. B60R 22/35 242/382.3
6,213,421 B1 * 4/2001 Franklin ................ B60C 27/12 152/219
6,904,872 B2 * 6/2005 Muller ................ A01K 27/004 119/796
8,336,505 B2 * 12/2012 Lopusnak ........... A01K 27/004 119/796
8,683,960 B2 * 4/2014 O'Brien .............. A01K 27/004 119/796
9,414,572 B2 * 8/2016 O'Brien .............. A01K 27/004
9,717,218 B2 * 8/2017 O'Brien ............ B65H 75/4431
11,457,612 B2 * 10/2022 Duffin ................. A01K 27/004
2011/0126778 A1 * 6/2011 Mitchell ............. A01K 27/006 119/796
2017/0142935 A1 * 5/2017 Max .................... A01K 27/004

* cited by examiner

*Primary Examiner* — Marisa V Conlon
(74) *Attorney, Agent, or Firm* — JCIPRNET

(57) ABSTRACT

A pet leash device includes a base, an upper shell connected to the base, a reel, a leash wound in the reel, a leash extractor, and a damping assembly. The reel is arranged around a rotating shaft arranged on the base. The leash extractor is connected to the base. A notch matching the leash extractor is provided on the upper shell. The damping assembly includes first and second gears, a fixing member, a spring, and a gasket. At least two fixing sleeves are arranged on the base. The fixing member is connected to the fixing sleeves. Two ends of the spring are respectively pressed against the base and the gasket. Two sides of the first gear are respectively in friction contact with the gasket and the fixing member. The first and second gears form a clutch structure. A ring gear meshed with the second gear is arranged on the reel.

9 Claims, 3 Drawing Sheets

PET LEASH DEVICE

CROSS-REFERENCE TO RELATED APPLICATION

This application claims the priority benefit of China application serial no. 202410048834.3, filed on Jan. 12, 2024. The entirety of the above-mentioned patent application is hereby incorporated by reference herein and made a part of this specification.

BACKGROUND

Technical Field

The present disclosure belongs to the technical field of pet products, and specifically to a pet leash device.

Description of Related Art

Pets are friendly friends of human beings, and more and more people begin to keep pets. Taking pets out is a necessary activity for keeping pets. Keeping pets on a leash when outside is of great significance to the safety of other people and pets. When taking a pet out for activities, it is necessary to ensure that the pet has a large range of movement and that the keeper can control the range of movement in a timely manner. Accordingly, a telescopic leash device with a locking function has been devised, which not only ensures that the pet has a large range of movement, but also ensures that the keeper can control the range of movement of the pet. Existing telescopic leash devices usually have an automatic retraction function. Generally, an elastic restoring force of a coil spring is used to drive the reel to rotate and retract the leash. For such leash devices, the retraction speed of the leash is too high, and the leash is likely to rebound and hurt the user, leading to poor safety performance.

SUMMARY

A pet leash device includes a base, an upper shell, a reel, a leash, a leash extractor, and a damping assembly, wherein a rotating shaft is arranged on an end surface of the base, the reel is arranged around the rotating shaft, and the leash is wound in an annular groove on a side wall of the reel;

the leash extractor is detachably connected to an edge of the base to guide the leash to extend out of the upper shell;

the upper shell is detachably connected to the base, and a notch matching the leash extractor is provided on a side wall of the upper shell;

the damping assembly is arranged on the end surface of the base, and the damping assembly includes a first gear, a second gear, a fixing member, a spring, and a gasket;

at least two fixing sleeves are arranged on the base, and the fixing member is detachably connected to a top of each of the at least two fixing sleeves;

the spring, the gasket, and the first gear are arranged on a same one of the at least two fixing sleeves, a first end of the spring is pressed against the gasket, a second end of the spring is pressed against the end surface of the base, a first side of the first gear is in friction contact with a bottom surface of the fixing member, and a second side of the first gear is in friction contact with an end surface of the gasket;

the second gear is slidably arranged on the fixing member, and forms a clutch structure with the first gear; and a ring gear is arranged on one side of the reel, and the ring gear is meshed with the second gear.

Preferably, the damping assembly further includes at least one positioning column and at least one positioning hole, the at least one positioning column is arranged on the end surface of the base, the at least one positioning hole is provided on the fixing member, and a top of the at least one positioning column is arranged in the at least one positioning hole.

Preferably, the damping assembly further includes a first slide groove, a second slide groove, and two connecting blocks;

the first slide groove is provided on the end surface of the base, and the second slide groove is provided on the fixing member; and the two connecting blocks are respectively coaxially arranged on two sides of the second gear, and are respectively slidably connected to the first slide groove and the second slide groove.

Preferably, a slot is provided on the leash extractor, and the slot is arranged parallel to the base.

Preferably, a fixing pin is detachably connected in the annular groove on the side wall of the reel, and the fixing pin is connected to one end of the leash.

Preferably, a sink is provided on a top surface of the reel, a coil spring is detachably connected in the sink, a first end of the coil spring is connected to the rotating shaft, and a second end of the coil spring is connected to a mounting plate in the sink.

Preferably, a cover plate is detachably connected at an opening of the sink, and a top of the cover plate is rotatably connected to an inner wall of the upper shell.

Preferably, the pet leash device further includes a manual lock, where the manual lock is arranged in the upper shell, and the manual lock includes a lining plate, a movable plate, and two locking blocks;

the lining plate is detachably connected to an inner wall of the upper shell, the movable plate is slidably connected to an end surface of the lining plate, and the two locking blocks are respectively arranged on two sides of the movable plate; and a first through hole is provided on the lining plate to allow one of the two locking blocks to extend out of the lining plate and engage with teeth on another side of the reel, and a second through hole is provided on an end surface of the upper shell to allow the other one of the two locking blocks to extend out of the upper shell.

Preferably, a buffer is arranged at an end of the leash extending out of the upper shell.

Preferably, a protective casing is detachably connected to a surface of the upper shell, clearance slots are provided on the protective casing, and the clearance slots are configured to allow the leash extractor and one of locking blocks to respectively extend out.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following description, numerous specific details are given to provide a more thorough understanding of the present disclosure. However, it will be apparent to those skilled in the art that the present disclosure can be practiced without one or more of these details. In some other examples, to avoid confusion with the present disclosure, some technical features well known in the art are not described.

Embodiment 1

Figure 1:
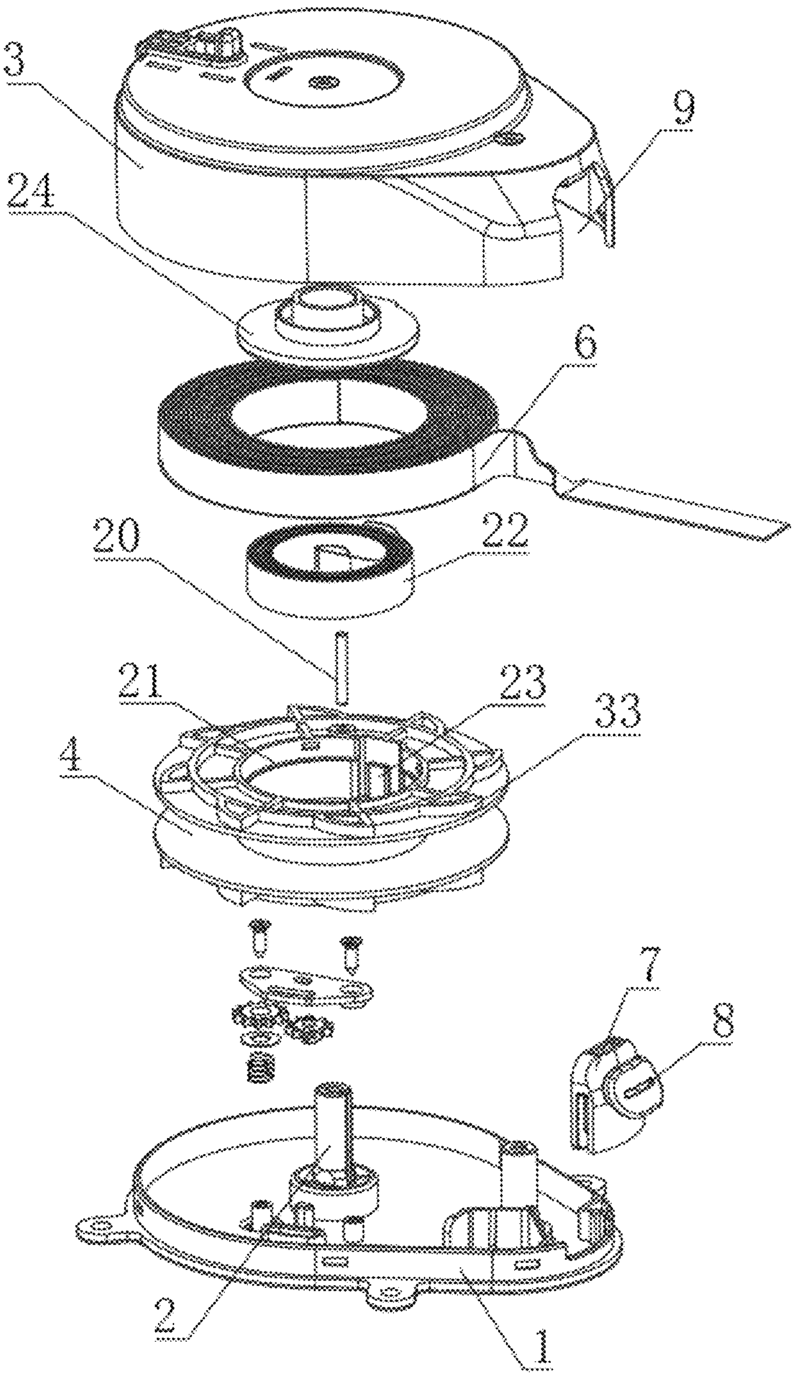
FIG. 1 is an exploded view of a pet leash device according to the present disclosure.
Figure 2:
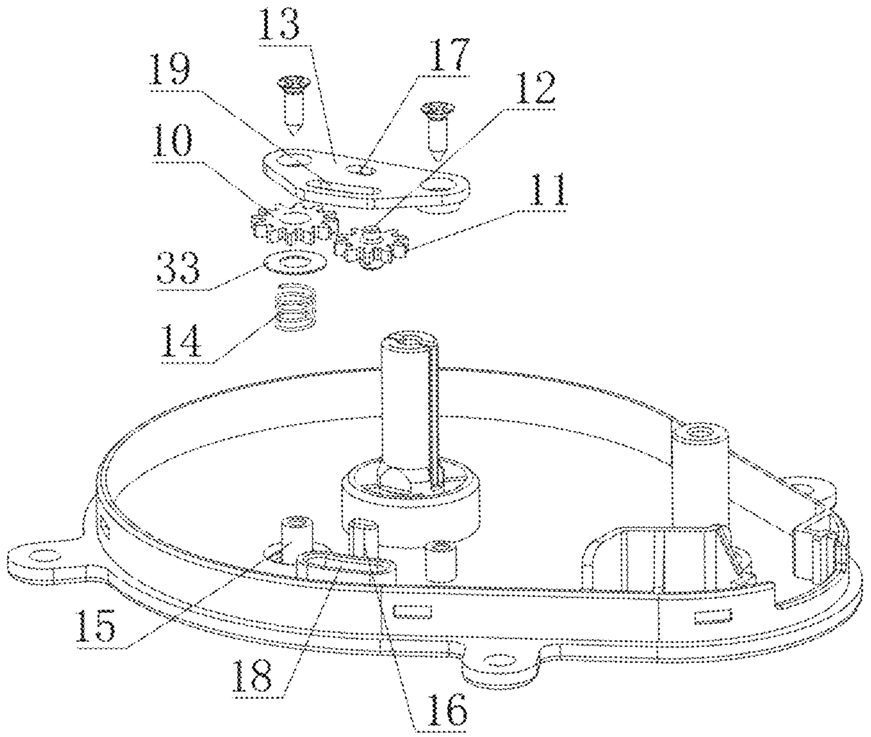
FIG. 2 is a partial exploded view of a pet leash device according to the present disclosure.
Figure 3:
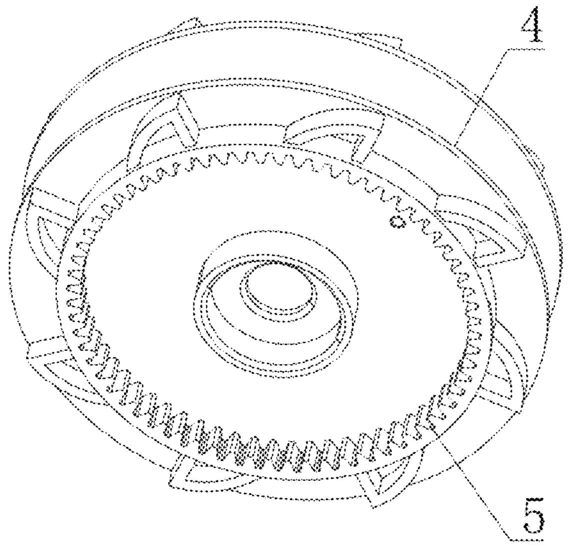
FIG. 3 is a schematic view of a reel of a pet leash device according to the present disclosure.

As shown in FIG. 1 to FIG. 3, a pet leash device disclosed in this embodiment includes a base 1, an upper shell 3, a reel 4, a leash 6, a leash extractor 7, and a damping assembly. A rotating shaft 2 is arranged on an end surface of the base 1. The reel 4 is arranged around the rotating shaft 2. The leash 6 is wound in an annular groove on a side wall of the reel 4. The leash extractor 7 is detachably connected to an edge of the base 1 to guide the leash 6 to extend out of the upper shell 3. The upper shell 3 is detachably connected to the base 1. A notch 9 matching the leash extractor 7 is provided on a side wall of the upper shell 3. The damping assembly is arranged on the end surface of the base 1. The damping assembly includes a first gear 10, a second gear 11, a fixing member 13, a spring 14, and a gasket 33. At least two fixing sleeves 15 are arranged on the base 1. The fixing member 13 is detachably connected to a top of each of the fixing sleeves 15. The spring 14, the gasket 33, and the first gear 10 are arranged on the same fixing sleeve 15. A first end of the spring 14 is pressed against the gasket 33, and a second end of the spring 14 is pressed against the end surface of the base 1. A first side of the first gear 10 is in friction contact with a bottom surface of the fixing member 13, and a second side of the first gear 10 is in friction contact with an end surface of the gasket 33. The second gear 11 is slidably arranged on the fixing member 13, and forms a clutch structure with the first gear 10. A ring gear 5 is arranged on one side of the reel 4. The ring gear 5 is meshed with the second gear 11. When the leash 6 is retracted, the reel 4 drives the ring gear 5 to rotate, causing the second gear 11 to rotate and slide to mesh with the first gear 10 to drive the first gear 10 to rotate. The two sides of the first gear 10 are respectively in friction with the gasket 33 and the fixing member 13 to generate resistance to reduce the rotation speed of the reel 4 and thus slow down the retraction of the leash 6, thereby preventing the leash 6 from being retracted too fast and rebounding to injure the user, and improving the safety performance of the pet leash device in use.

As shown in FIG. 2, the damping assembly further includes at least one positioning column 16 and at least one positioning hole 17. The at least one positioning column 16 is arranged on the end surface of the base 1. The at least one positioning hole 17 is provided on the fixing member 13. A top of the at least one positioning column 16 is arranged in the at least one positioning hole 17. The at least one positioning hole 17 may be respectively connected to the at least one positioning column 16 by an interference fit to ensure the stability of the fixing member 13 and prevent the fixing member 13 from shaking to affect the state of meshing between the second gear 11 and the ring gear 5.

As shown in FIG. 2, the damping assembly further includes a first slide groove 18, a second slide groove 19, and two connecting blocks 12. The first slide groove 18 is provided on the end surface of the base 1. The second slide groove 19 is provided on the fixing member 13. The connecting blocks 12 are respectively coaxially arranged on two sides of the second gear 11, and are respectively slidably connected to the first slide groove 18 and the second slide groove 19. A movement trajectory of the second gear 11 is controlled by the first slide groove 18 and the second slide groove 19, so that the second gear 11 is stably meshed with the first gear 10 after moving along the trajectory.

As shown in FIG. 1, a slot 8 is provided on the leash extractor 7, and the slot 8 is arranged parallel to the base 1. The leash 6 is twisted a predetermined angle through the slot 8, so that the leash 6 is in a flat state when extending out of the upper shell 3, to prevent entanglement and twisting of the leash 6 and improve the flatness of the leash 6 during retraction and extension.

As shown in FIG. 1, a fixing pin 20 is detachably connected in the annular groove on the side wall of the reel 4, and the fixing pin 20 is connected to one end of the leash 6. The end of the leash 6 is fixed through the fixing pin 20.

As shown in FIG. 1, a sink 21 is provided on a top surface of the reel 4, a coil spring 22 is detachably connected in the sink 21, a first end of the coil spring 22 is connected to the rotating shaft 2, and a second end of the coil spring 22 is connected to a mounting plate 23 in the sink 21. An elastic restoring force of the coil spring 22 drives the reel 4 to rotate, thus automatically retracting the leash 6.

As shown in FIG. 1, a cover plate 24 is detachably connected at an opening of the sink 21, and a top of the cover plate 24 is rotatably connected to an inner wall of the upper shell 3. The cover plate 24 presses against the coil spring 22 to prevent the coil spring 22 from falling out of the sink 21 to affect the normal use of the pet leash device.

Embodiment 2

Figure 4:
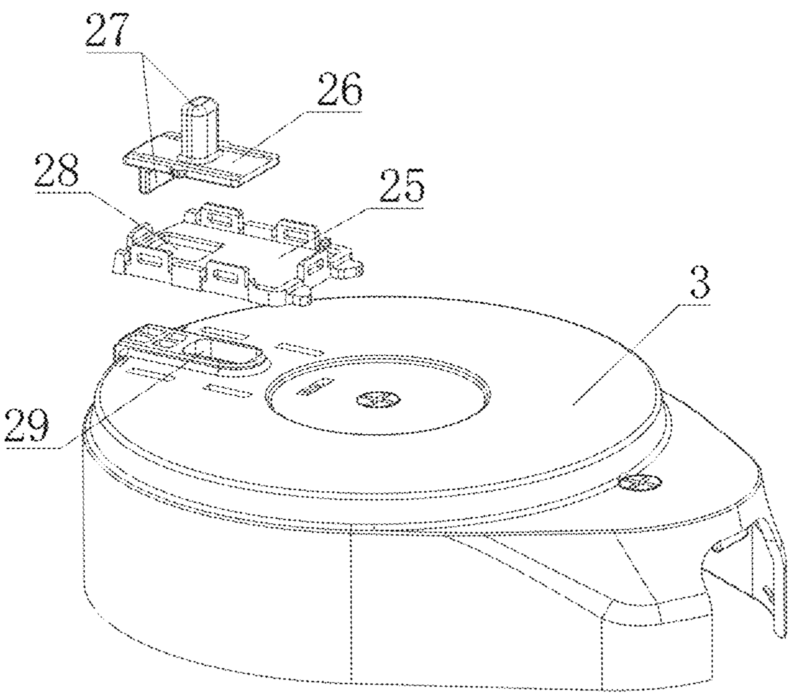
FIG. 4 is a partial exploded view of a pet leash device according to the present disclosure.

As shown in FIG. 4, different from Embodiment 1, a pet leash device disclosed in this embodiment further includes a manual lock. The manual lock is arranged in the upper shell 3. The manual lock includes a lining plate 25, a movable plate 26, and two locking blocks 27. The lining plate 25 is detachably connected to an inner wall of the upper shell 3. The movable plate 26 is slidably connected to an end surface of the lining plate 25. The locking blocks 27 are respectively arranged on two sides of the movable plate 26. A first through hole 28 is provided on the lining plate 25 to allow one of the locking blocks 27 to extend out of the lining plate 25 and engage with teeth on another side of the reel 4. A second through hole 29 is provided on an end surface of the upper shell 3 to allow the other locking block 27 to extend out of the upper shell 3. One of the locking blocks 27 is pushed to drive the movable plate 26 to move and cause the other locking block 27 to engage with the teeth on the side of the reel 4, thus locking the reel 4. The length by which the leash 6 is extended is controlled to freely control the range of movement of the pet, thereby improving the safety of the user walking the pet.

Embodiment 3

Figure 5:
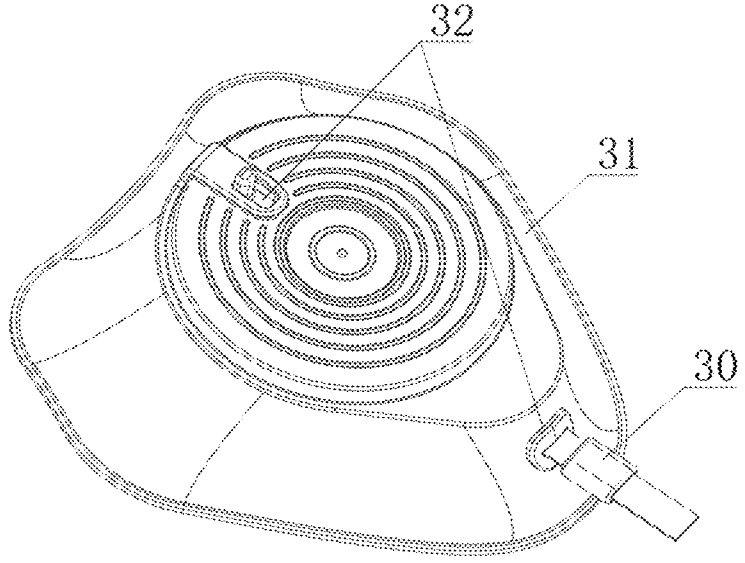
FIG. 5 is a schematic view of a protective casing of a pet leash device according to the present disclosure.

As shown in FIG. 5, different from Embodiment 1, in a pet leash device disclosed in this embodiment, a buffer 30 is arranged at an end of the leash 6 extending out of the upper shell 3. When the leash 6 is retracted, the leash extractor 7 and the upper shell 3 are separated from a fastener connected at the end of the leash 6 by the buffer 30 to prevent the leash extractor 7 and the upper shell 3 from being damaged due to collision with the fastener.

Embodiment 4

As shown in FIG. 5, different from Embodiment 1, in a pet leash device disclosed in this embodiment, a protective casing 31 is detachably connected to a surface of the upper shell 3, and clearance slots 32 are provided on the protective casing 31. The clearance slots 32 are configured to allow the leash extractor 7 and one of the locking blocks 27 to respectively extend out. The protective casing 31 arranged on the surface of the upper shell 3 improves aesthetics of the pet leash device and protects the upper shell 3.

The present disclosure has the following advantages.

1. When the leash is retracted, the reel drives the ring gear to rotate, causing the second gear to rotate and slide to mesh with the first gear to drive the first gear to rotate. The two sides of the first gear are respectively in friction with the gasket and the fixing member to generate resistance to reduce the rotation speed of the reel and thus slow down the retraction of the leash, thereby preventing the leash from being retracted too fast and rebounding to injure the user, and improving the safety performance of the pet leash device in use.
2. The leash is twisted a predetermined angle through the slot, so that the leash is in a flat state when extending out of the upper shell, to prevent entanglement and knotting of the leash and improve the flatness of the leash during retraction and extension.
3. One of the locking blocks is pushed to drive the movable plate to move and cause the other locking block to engage with the teeth on the other side of the reel, thus locking the reel. The length by which the leash is extended is controlled to freely control the range of movement of the pet, thereby improving the safety of the user walking the pet.
4. When the leash is retracted, the leash extractor and the upper shell are separated from a fastener connected at an end of the leash by the buffer to prevent the leash extractor and the upper shell from being damaged due to collision with the fastener.

Preferred embodiments of the present disclosure have been described in detail above in conjunction with the accompanying drawings, but the present disclosure is not limited to the specific details in the above embodiments. Various equivalent modifications can be made to the technical solutions of the present disclosure without departing from the scope of the technical concept of the present disclosure. Such equivalent modifications shall all fall within the protection scope of the present disclosure.

What is claimed is:

1. A pet leash device, comprising:

a base;

an upper shell, detachably connected to the base;

a reel, arranged around a rotating shaft, wherein the rotating shaft is arranged on an end surface of the base;

a leash, wound in an annular groove on a side wall of the reel;

a leash extractor, detachably connected to an edge of the base to guide the leash to extend out of the upper shell, wherein a notch matching the leash extractor is provided on a side wall of the upper shell; and a damping assembly, arranged on the end surface of the base, and comprising a first gear, a second gear, a fixing member, a spring, and a gasket, wherein at least two fixing sleeves are arranged on the base, and the fixing member is detachably connected to a top of each of the at least two fixing sleeves, the spring, the gasket, and the first gear are arranged on a same one of the at least two fixing sleeves, a first end of the spring is pressed against the gasket, a second end of the spring is pressed against the end surface of the base, a first side of the first gear is in friction contact with a bottom surface of the fixing member, and a second side of the first gear is in friction contact with an end surface of the gasket to generate resistance to reduce a rotation speed of the reel, the second gear is slidably arranged on the fixing member, and forms a clutch structure with the first gear, a ring gear is arranged on one side of the reel, and the ring gear is meshed with the second gear, the damping assembly further comprises a first slide groove, a second slide groove and two connecting blocks, the first slide groove is provided on the end surface of the base, and the second slide groove is provided on the fixing member, and the two connecting blocks are respectively coaxially arranged on two sides of the second gear, and are respectively slidably connected to the first slide groove and the second slide groove.

2. The pet leash device according to claim 1, wherein the damping assembly further comprises at least one positioning column and at least one positioning hole, the at least one positioning column is arranged on the end surface of the base, the at least one positioning hole is provided on the fixing member, and a top of the at least one positioning column is arranged in the at least one positioning hole.

3. The pet leash device according to claim 1, wherein a slot is provided on the leash extractor, and the slot is arranged parallel to the base.

4. The pet leash device according to claim 1, wherein a fixing pin is detachably connected in the annular groove on the side wall of the reel, and the fixing pin is connected to one end of the leash.

5. The pet leash device according to claim 1, wherein a sink is provided on a top surface of the reel, a coil spring is detachably connected in the sink, a first end of the coil spring is connected to the rotating shaft, and a second end of the coil spring is connected to a mounting plate in the sink.

6. The pet leash device according to claim 5, wherein a cover plate is detachably connected at an opening of the sink, and a top of the cover plate is rotatably connected to an inner wall of the upper shell.

7. The pet leash device according to claim 1, further comprising a manual lock, wherein the manual lock is arranged in the upper shell, and the manual lock comprises a lining plate, a movable plate, and two locking blocks;

the lining plate is detachably connected to an inner wall of the upper shell, the movable plate is slidably connected to an end surface of the lining plate, and the two locking blocks are respectively arranged on two sides of the movable plate; and a first through hole is provided on the lining plate to allow one of the two locking blocks to extend out of the lining plate and engage with teeth on another side of the reel, and a second through hole is provided on an end surface of the upper shell to allow the other one of the two locking blocks to extend out of the upper shell.

8. The pet leash device according to claim 7, wherein a protective casing is detachably connected to a surface of the upper shell, clearance slots are provided on the protective casing, and the clearance slots are configured to allow the leash extractor and one of the locking blocks to respectively extend out.

9. The pet leash device according to claim 1, wherein a buffer is arranged at an end of the leash extending out of the upper shell.

* * * * *